United States Patent
Hayakawa et al.

(10) Patent No.: US 9,359,010 B2
(45) Date of Patent: Jun. 7, 2016

(54) COWL-TOP COVER

(71) Applicant: NIHON PLAST CO., LTD., Fujinomiya-shi, Shizuoka (JP)

(72) Inventors: Norio Hayakawa, Shizuoka (JP); Hidehiko Osada, Shizuoka (JP); Daisuke Takei, Shizuoka (JP); Naoto Onuma, Shizuoka (JP)

(73) Assignee: NIHON PLAST CO., LTD., Fujinoyima (JP)

( * ) Notice: Subject to any disclaimer, the term of this patent is extended or adjusted under 35 U.S.C. 154(b) by 0 days.

(21) Appl. No.: 14/592,785

(22) Filed: Jan. 8, 2015

(65) Prior Publication Data

US 2015/0197285 A1    Jul. 16, 2015

(30) Foreign Application Priority Data

Jan. 10, 2014 (JP) ................................. 2014-003538

(51) Int. Cl.
*B62D 25/08* (2006.01)

(52) U.S. Cl.
CPC .................... *B62D 25/081* (2013.01)

(58) Field of Classification Search
CPC .............................. B62D 25/081; B60R 21/34
USPC ..................... 296/192, 187.09, 96.21, 187.04
See application file for complete search history.

(56) References Cited

U.S. PATENT DOCUMENTS

| | | | | |
|---|---|---|---|---|
| 2005/0179285 A1* | 8/2005 | Nakajima et al. | ............. | 296/192 |
| 2012/0175913 A1* | 7/2012 | Makise et al. | ................ | 296/192 |
| 2013/0221705 A1* | 8/2013 | Sugishima et al. | ........... | 296/192 |
| 2015/0091331 A1* | 4/2015 | Takei et al. | ................... | 296/192 |
| 2015/0151791 A1* | 6/2015 | Sano et al. | | |

FOREIGN PATENT DOCUMENTS

| | | | |
|---|---|---|---|
| JP | 2003-532574 A | | 11/2003 |
| JP | 2004-155351 A | | 6/2004 |
| JP | 2005-280628 A | | 10/2005 |
| JP | 2008-201314 A | | 9/2008 |
| JP | 2010-083326 A | * | 4/2010 |
| JP | 2011-051450 A | | 3/2011 |

OTHER PUBLICATIONS

Great Britain Search Report dated Jun. 30, 2015; Application No. GB1500364.3.

* cited by examiner

*Primary Examiner* — Jason S Morrow

(74) *Attorney, Agent, or Firm* — Arent Fox LLP (57) ABSTRACT

A cowl-top cover capable of restraining a resistance force with respect to a load from a direction crossing a front glass face while improving its related appearance is provided. A cover main body portion is provided with a cover mounting portion adapted to be inserted into and engaged with, in a direction crossing a front glass face, an engagement receptacle portion disposed along a longitudinal direction at an edge part of a front glass from one end part in the longitudinal direction. The cover main body portion is provided with a low rigidity portion along the longitudinal direction at a position spaced from the cover mounting portion to an opposite side to the front glass.

6 Claims, 7 Drawing Sheets

COWL-TOP COVER

CROSS REFERENCE TO RELATED APPLICATIONS

This application claims priority of Japanese Patent Application No. 2014-003538 filed on Jan. 10, 2014. The contents of this application are incorporated herein by reference in their entirety.

BACKGROUND OF THE INVENTION

1. Field of the Invention

The present invention relates to a cowl-top cover provided with a cover main body portion disposed at an edge part of a wind shield as a vehicle widthwise direction is defined as a longitudinal direction.

2. Description of the Related Art

Conventionally, there has been employed a cowl-top cover which is disposed at a so called cowl portion between a front end part of a front glass and a rear side part of a bonnet/hood of a motor vehicle, the cowl-top cover being adapted to cover this cowl portion to thereby improve its related appearance. Such a cowl-top cover is provided with a plate-shaped cover main body portion adapted to cover the cowl portion; a cover mounting portion formed at a rear end part of the cover main body portion is mounted so as to hold the front end part of the front glass from top and bottom; and a panel placement face portion serving as a vehicle body mounting member which is formed at a lower part of a front side of the cover main body portion is fixed to and supported by a vehicle body panel and then is mounted to a vehicle body. Further, at an upper part of the front side of the cover main body portion, at a front end part of a longitudinal wall portion which is erected to an upper side, there is provided a hood sealing face portion serving as a counterpart member opposite portion which is opposite to the bonnet/hood, and to which an elastically deformable sealing member is to be mounted; and the hood sealing face portion comes into intimate contact with a lower face of a rear end of the bonnet/hood in a state in which the sealing member mentioned above is closed, and is adapted to shut out the hot air or the offensive smell from an engine room (for example, Japanese Unexamined Patent Application Publication No. 2011-51450).

In connection with the employment of such a construction, in recent years, there has been known a construction in which: an engagement receptacle portion is provided at a front end part of a front glass; a cover mounting portion of a cowl-top cover formed in a claw shape is inserted into the engagement receptacle portion; and the cowl-top cover is disposed in parallel to the front glass, whereby the cover mounting portion of the cowl-top cover does not overlap with a front glass face, and the cowl-top cover has a reduced step difference with the front glass face, or alternatively, the cowl-to cover has no step difference (the cowl-top cover is in flush with the front glass face) (for example, Japanese Patent Application Publication No. 2003-532574). With this construction, there are attained advantages that: a good appearance (a design effect of a flush surface) and an aerodynamic effect can be obtained; and a wiping range of a wiper can be set from the cowl-top cover (a so called concealed wiper can be obtained in such a manner as to be able to be disposed under the hood while not in use, and can be turned at a given angle from a storage position to a maximum protrusion position (for example, Japanese Patent Application Publication No. 2003-532574).

However, in the case of this construction, when a load is applied from an upper side to a lower side of the bonnet/hood, for example, a direction of engagement between the engagement receptacle portion and the cover mounting portion and a loading direction are the same as each other; and therefore, the engagement receptacle portion and the cover mounting portion are not disengaged from each other, and there is a danger that an excessive resistance force takes place owing to bottoming of the cowl-top cover that has been deformed in compliance with the applying of the load.

As described above, there is a desire for a cowl-top cover which is capable of restraining a resistance force with respect to a load from a direction crossing a wind shield face while improving its related appearance.

The present invention has been made in view of such a circumstance, and it is an object of the present invention to provide a cowl-top cover which is capable of restraining a resistance force with respect to a load from a direction crossing a wind shield face while improving its related appearance.

SUMMARY OF THE INVENTION

A cowl-top cover according to a first aspect of the present invention is directed to a cowl-top cover comprising a cowl-top cover comprising a cover main body portion disposed at an edge part of a wind shield as a vehicle widthwise direction is defined as a longitudinal direction, and is provided in such a manner that the cover main body portion comprises: an engagement portion disposed along a longitudinal direction from one end part of the longitudinal direction, the engagement portion being inserted into and engaged with an engagement receptacle portion disposed at an edge part of the wind shield, in a direction crossing the wind shield face; and a low rigidity portion formed along the longitudinal direction at a position spaced from the engagement portion to an opposite side to a wind shield.

A cowl-top cover according to a second aspect of the present invention is directed to the cowl-top cover according to the first aspect, and is provided in such a manner that the cover main body portion comprises: a flat plate portion disposed substantially in parallel to the wind shield face; and a bending portion continuous to the flat face portion, the bending portion being folded and bent in a direction crossing the wind shield face, andthe low rigidity portion is formed at a part of the bending portion.

A cowl-top cover according to a third aspect of the present invention is directed to the cowl-top cover according to the second aspect, and is provided in such a manner that the bending portion is a portion which a back face of at least a part of a portion other than the low rigidity portion is reduced in thickness.

A cowl-top cover according to a fourth aspect of the present invention is directed to the cowl-top cover according to the first aspect, and is provided in such a manner that the low rigidity portion comprises a small thickness portion formed in a longitudinal direction intermittently while the back face of the cover main body portion is reduced in thickness.

In so far as the cowl-top cover according to the first aspect of the present invention is concerned, an engagement portion is inserted, in a direction crossing a wind shield face, into an engagement receptacle portion disposed at an edge part of the wind shield. For example, the edge part of the wind shield and a cover main body portion can be caused to be continuous so as to be in flush with each other; its related appearance is improved; and in a case where a load is applied in the direction crossing the wind shield face, a stress concentrates on a low rigidity portion, the cover main body portion is deformed while the low rigidity portion is defined as a start point, and a resistance force with respect to the load can be restrained.

In so far as the cowl-top cover according to the second aspect of the present invention is concerned, in addition to the advantageous effect of the cowl-top cover according to the first aspect of the present invention, a low rigidity portion is formed at a part of a bending portion continuous to a flat plate portion disposed substantially in parallel to a wind shield face, the bending portion being folded and bent in a direction crossing the wind shield face, whereby, when a load is applied in the direction crossing the wind shield face, a stress is more likely to concentrate on the low rigidity portion, a cover main body portion is deformed more reliably while the low rigidity portion is defined as a start point, and a resistance force with respect to the load can be restrained more reliably.

In so far as the cowl-top cover according to the third aspect of the present invention is concerned, in addition to the advantageous effect of the cowl-top cover according to the second aspect of the present invention, a back face of at least a part of a portion other than a low rigidity portion of a bending portion is reduced in thickness; and therefore, when a load is applied in a direction crossing a wind shield face, a cover main body portion is deformed more reliably from the low rigidity portion and the bending portion, and a resistance force with respect to the load can be restrained more reliably.

In so far as the cowl-top cover according to the fourth aspect of the present invention is concerned, in addition to the advantageous effect of the cowl-top cover according to the first aspect of the present invention, a low rigidity portion comprises a small thickness portion formed in a longitudinal direction intermittently while a back face of a cover main body portion is reduced in thickness; and therefore, when a load is applied in a direction crossing a wind shield face, a cover main body portion is deformed more reliably while the low rigidity portion is defined as a start point, a resistance force with respect to this load can be restrained more reliably, and the low rigidity portion cannot be seen from the outside of a motor vehicle in a state in which the cowl-top cover is mounted, and further, its related appearance is improved more remarkably.

BRIEF DESCRIPTION OF THE DRAWINGS

FIGS. 1(a) and 1(b) are sectional views of a cowl-top cover according to a first embodiment of the present invention, wherein

DESCRIPTION OF THE PREFERRED EMBODIMENTS

Hereinafter, a cowl-top cover according to a first embodiment of the present invention will be described with reference to the accompanying drawings.

In FIG. 1 to FIG. 6, reference numeral 10 designates a vehicle body of a motor vehicle, and in the vehicle body 10, a cowl-top cover 16 is mounted to the vehicle body 10 in such a manner as to cover a cowl portion 16 between a hood 12 serving as a counterpart member adapted to cover an engine room 11 and a front glass 14 serving as a wind shield which is positioned on a front side of a vehicle chamber 13. It is to be noted that, hereinafter, directions such as a forward and backward direction, a vertical direction, and a lateral direction will be described with reference to a cruising direction of the vehicle body 10, a direction indicated by the arrow F designates a forward direction, a direction indicated by the arrow U designates an upward direction, and a direction indicated by the arrow W designates a vehicle widthwise direction which is a lateral direction.

In addition, the cowl portion 15 is also referred to as an air box or the like, and is formed in a drainpipe shape which opens on an upper side, by way of a cowl-top panel, although not shown, which is formed on an iron plate, for example, and a vehicle body panel 22 serving as a vehicle body member which is formed on the iron plate, the vehicle body member constituting a vehicle body, for example. In addition, at an upper side part of the cowl-top panel, the front glass 14 is fixed to the cowl-top panel by way of a sealing member, although not shown, including a rubber-based adhesive agent adapted to come into intimate liquid contact with something, such as a hot melt type adhesive agent. Also, the vehicle body panel 22 is also referred to as an extension panel or the like, and there are provided: a front plate portion 25 obtained as a bottom plate portion, although not shown, a rear side part of which is secured to the cowl-top panel while a front side part of this bottom plate portion is erected on a front upper side; and a support plate portion 26 serving as a vehicle body side support portion while an upper end part of the front plate portion 25 is extensively provided substantially horizontally on a front side. In addition, an air intake portion of an air conditioning apparatus, although not shown, which is adapted to introduce an atmospheric air into the vehicle chamber 13, is connected to the cowl portion 15, and a motor or the like adapted to drive a wiper arm of a wiper, although not shown, is disposed on a right side which is one side of the cowl portion 15.

Also, the hood 12 is obtained as a bonnet/hood which is positioned at a front part of the vehicle body 10, the bonnet/hood being adapted to openably cover the engine room 11, and there are formed integrally or separately: a hood outer portion positioned outside of the hood, that is, on an upper side in a state in which the outer portion is closed; and a hood inner portion positioned inside of the hood outer portion, that is, on a lower side via slight gaps in a state in which the inner portion is closed.

Further, an engagement member 28 which is formed of a synthetic resin or the like, for example, is integrally mounted all over a front edge part which is opposite to a rear end part of the cowl-top cover 16 of the front glass 14, and an engagement receptacle portion 29 for mounting and retaining the cowl-top cover 16 is formed on the engagement member 28. The engagement member 29 is formed in a recessed groove which opens toward an upper side, and is disposed in a longitudinal manner in a vehicle widthwise direction so as to be continuous all over the front edge part of the front glass 14. Also, claw-shaped engagement protrusions 29a, 29a are respectively protrusively provided at upper and lower edge parts of the engagement receptacle portion 29.

In addition, the cowl-top cover 16 is also referred to as a cowl cover or the like, and is formed in an elongated substantial plate shape while a lateral direction of the vehicle body 10, that is, a vehicle widthwise direction is defined as a longitudinal direction along the cowl portion 15 so as to improve its related appearance in a state in which the cowl portion 15, that is, an upper side of the vehicle body panel 22 is covered with the cowl-top cover.

The cowl-top cover 16 is provided with a plate-shaped cover main body portion 30 disposed so as to communicate with the front edge part of the front glass 14 while the vehicle widthwise direction is defined as the longitudinal direction. In addition, in so far as a sectional shape of the cover main body portion 30 is concerned, basically, a main body portion 31 is provided; a vehicle body mounting portion 32 which is a panel placement face portion supported by the support plate portion 26 is continuously provided at a front end part which is a tip end part of the main body portion 31; and a cover mounting portion 33 serving as an engagement portion inserted into and engaged with the engagement receptacle portion 29 at the front edge part of the front glass 14 is continuously provided at a rear end part which is a proximal end part of the main body portion 31, and is adapted to cover the cowl portion 15 between the front edge part of the front glass 14 and the support plate portion 26 so as to partition a gap between the support plate portion 26 and the hood 12 that is opposite to an upper side of the support plate portion 26, that is, a gap between the engine room 11 and the cowl portion 15. In addition, the cover main body portion 30 of the cowl-top cover 16 is divided into a main body member 35 serving as one divisional member and an auxiliary member 36 which is a capping member serving as another divisional member.

Here, the main body member 35 is obtained as a large sized member constituting a major part of the cover main body portion 30 of the cowl-top cover 16, and constitutes a main body portion 31 other than an opening portion 38 which is formed so as to be cut out at a substantial center part in a longitudinal direction. That is, the opening portion 38 is obtained as a divisional line adapted to divide the main body member 35 and the auxiliary member 36 into two sections, and is formed in a rectangular shape while the vehicle widthwise direction is defined as the longitudinal direction. The opening portion 38 communicates with the inside of the cowl portion 15, and enables an external access to the cowl portion 15.

Also, the auxiliary member 36 is obtained as a small sized flat member (a plate-shaped member which is smaller than the main body member 35) constituting a remaining portion other than the main body portion 35 of the cover main body portion 30 of the cowl-top cover 16. In addition, this auxiliary member is obtained as a capping portion adapted to removably close the opening portion 38, the capping portion constituting the entirety of the cowl-top cover 16 (the cover main body portion 30) together with the main body member 35.

In addition, in so far as the cowl-top cover 16 is concerned, the cover main body portion 30 is constructed while the auxiliary member 36 is mounted to the opening portion 38 of the main body member 35.

The main body portion 31 is constructed in a shape formed toward a side of the front glass 14; is obtained as a general face which can be referred to as a connecting wall; and is formed in an appropriate shape according to the shape of the engine room 11 or the hood 12 and the layout of wipers or the like, whereas in the embodiment, basically, this main body portion is integrally provided with: a flat plate portion 41 formed in a shape of a flat plate which is inclined substantially in parallel to the front glass 14, the flat plate being continuous in a longitudinal direction while the vehicle widthwise direction is defined as the longitudinal direction; and a reverse V-shaped portion 42 serving as a stepped portion (a protrusion portion) continuous in a longitudinal direction while protruding upward from the flat plate portion 41, that is, toward the hood 12. In addition, the opening portion 39 mentioned above is formed so as to be cut out all over the flat plate portion 41 and the reverse V-shaped portion 42.

In the flat plate portion 41, there are formed: one and the other wiper pivot hole portions 46, 47 which are a plurality of, for example, two circular hole portions of which top faces are obtained as portions which are respectively substantially in flush with the front glass 14 (a front glass face 14a serving as a wind shield face) and the engagement member 28, in a state in which the cover mounting portion 33 is mounted to the engagement receptacle portion 29, and though which a lattice-shaped air intake or a wiper shaft pass, although not shown, the air intake being referred to as an air intake formed in a lattice shape and capable of introducing atmospheric air into the cowl portion 15.

One wiper pivot hole portion 46 is opened with respect to the flat plate portion 41 at one end part in the longitudinal direction of the main body portion 31. Also, the other wiper pivot hole portion 47 is opened with respect to the flat plate portion 41 at a position which is more proximal to one end part than a center part in the longitudinal direction of the main body portion 31, and is positioned on the same side as that of one wiper pivot hole portion 46 with respect to the opening portion 38. In other words, the opening portion 38 is positioned so as to be opposite to one wiper pivot hole portion 46 with respect to the other wiper pivot hole portion 47.

The reverse V-shaped portion 42 has a function of reinforcing the cowl-top cover 16, and is formed to extend in a longitudinal manner so as to be continuous along the longitudinal direction of the cowl-top cover 16 (the cover main body portion 30). The reverse V-shaped portion 42 is integrally provided with: a rear part longitudinal wall portion serving as a protrusion wall portion erected in an inclined shape from the front end part of the flat plate portion 41 to the front upper side; a top wall portion 52 which extends forward from an upper end part of the rear part longitudinal wall portion 51; and a front part longitudinal wall portion 53 which is caused to fall down in an inclined shape from the front end part of the top wall portion 52 to the front lower side.

Figure 1A:
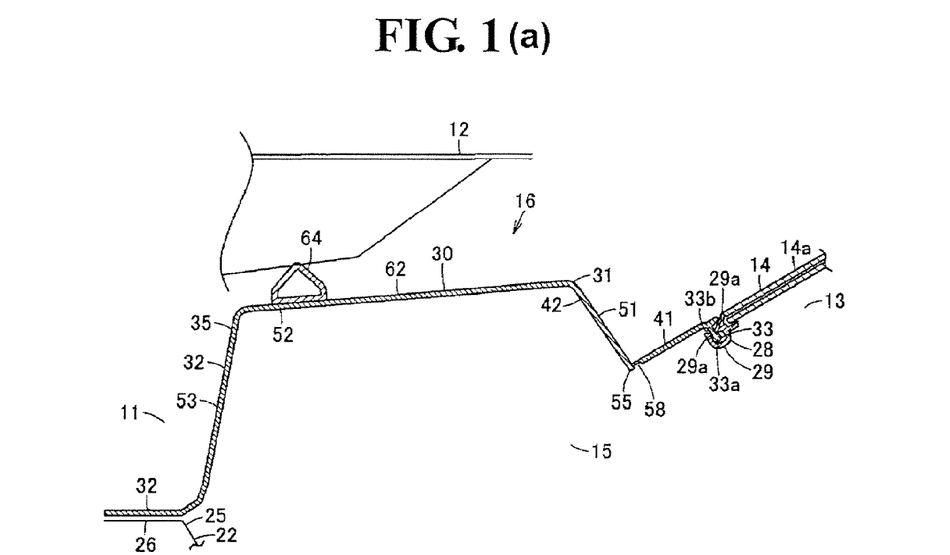
FIG. 1(a) is a sectional view taken along the line I-I of FIG. 2.
Figure 1B:
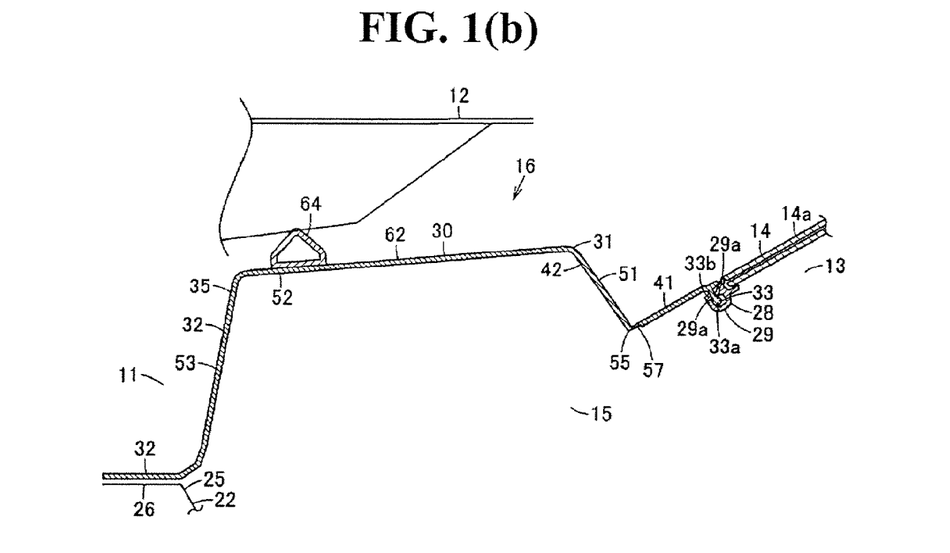
FIG. 1(b) is a sectional view taken along the line II-II of FIG. 2.
Figure 2:
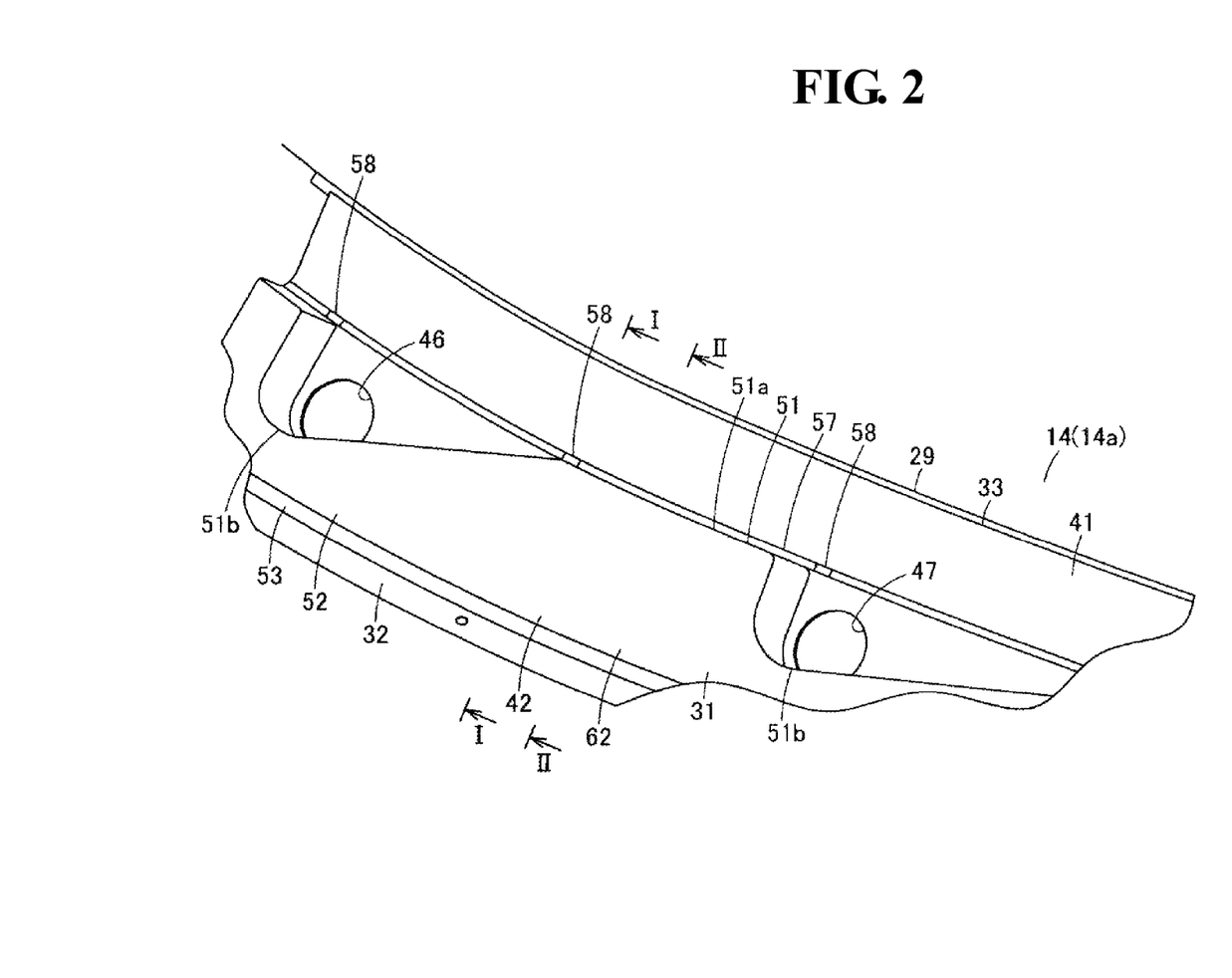
FIG. 2 is a perspective view showing a part of the same cowl-top cover as above from a front side.
Figure 3:
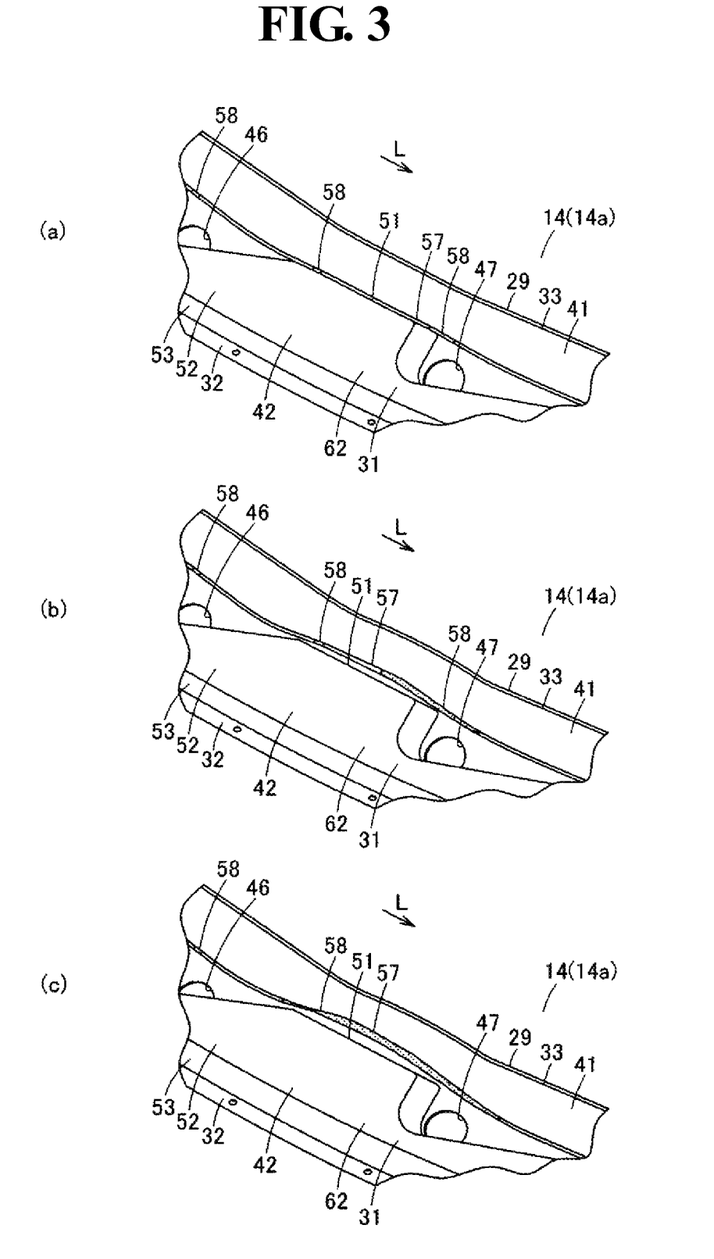
FIG. 3 is a perspective view showing, with an elapse of time, a deformation at a low rigidity portion of the same cowl-top cover as above in sequential order of (a) to (c)
Figure 4:
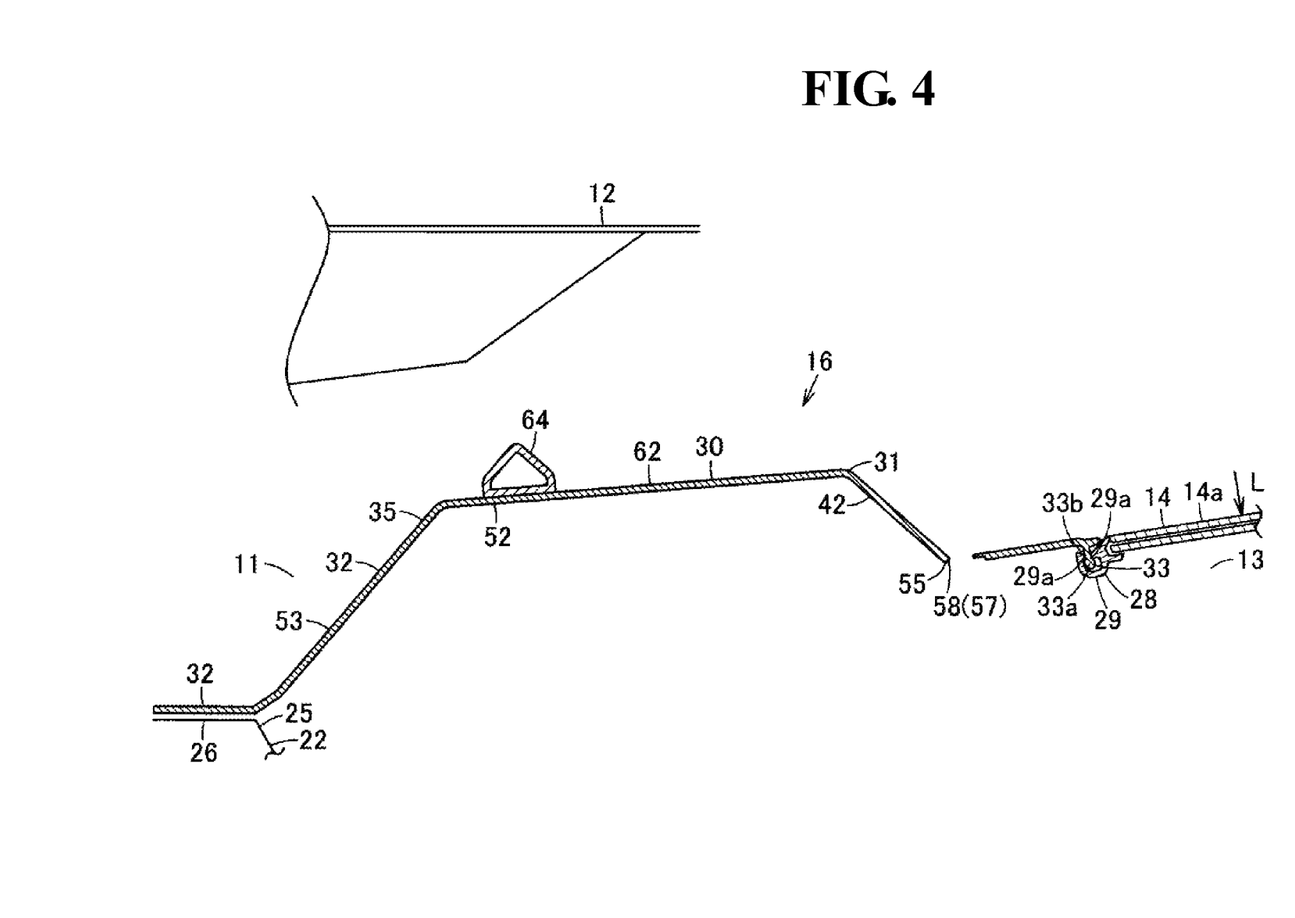
FIG. 4 is a sectional view showing a deformation at a low rigidity portion of the same cowl-top cover as above.
Figure 5:
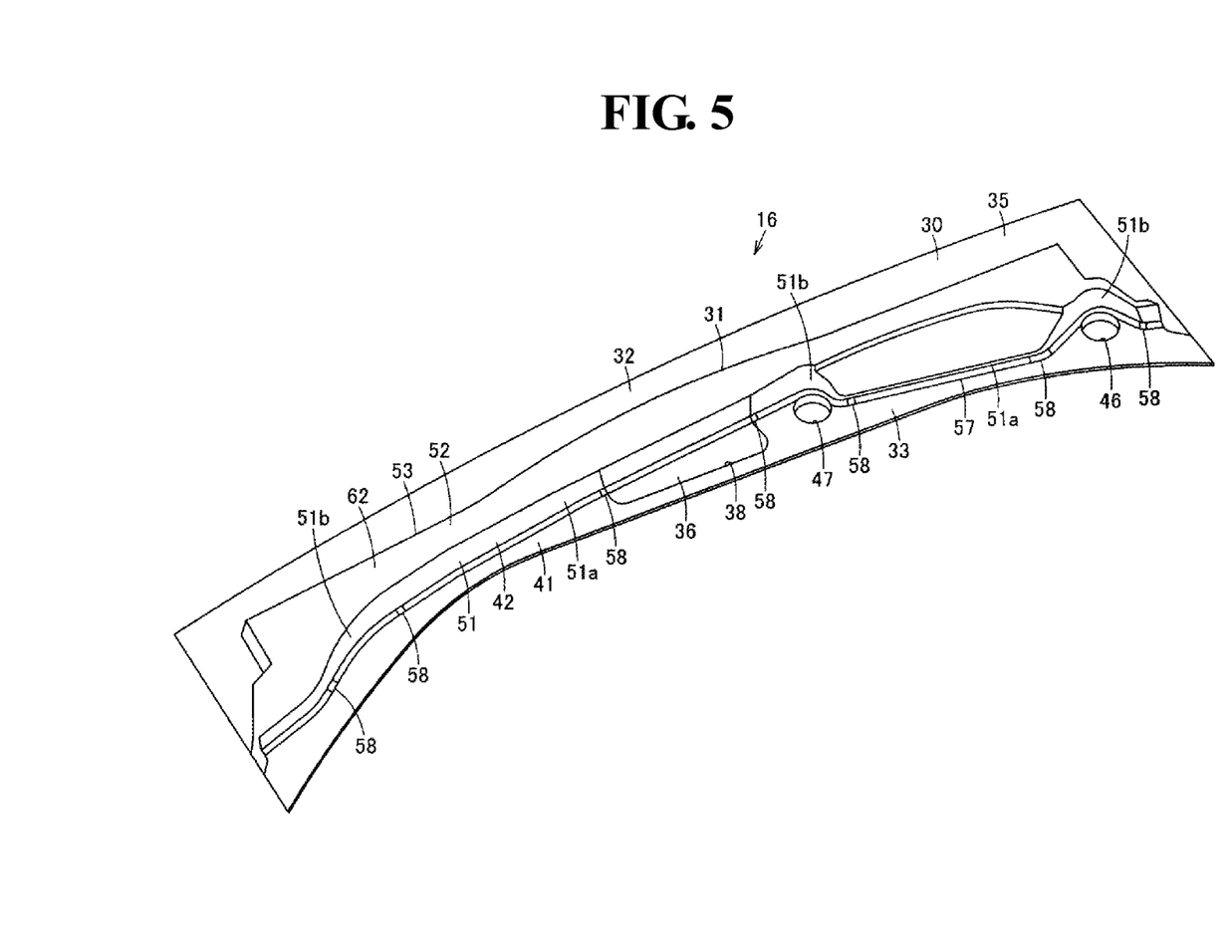
FIG. 5 is a perspective view showing the same cowl-top cover as above from a rear side.
Figure 6:
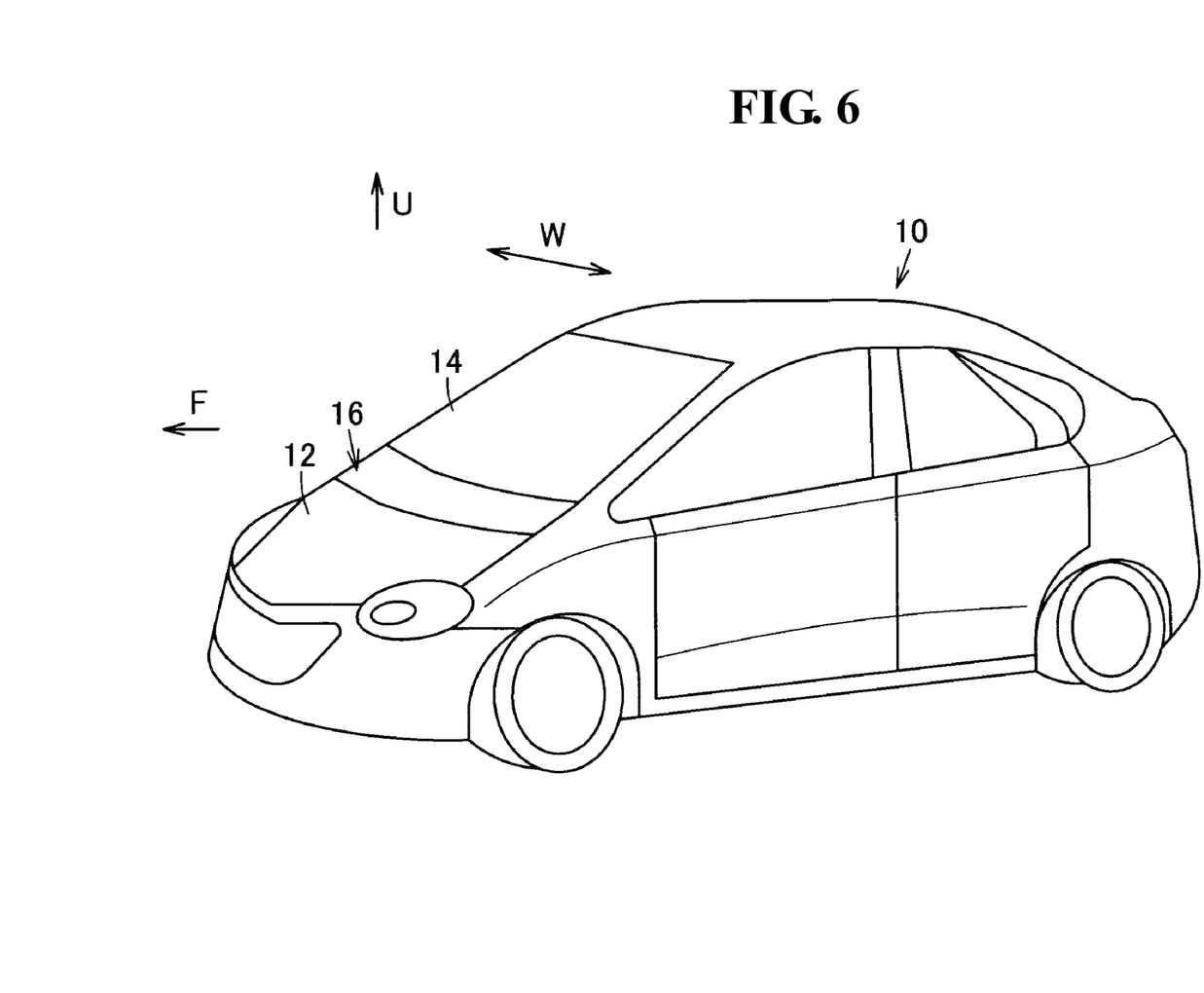
FIG. 6 is a perspective view showing a vehicle which is provided with the same cowl-top cover as above.

The rear part longitudinal wall portion 51 is adapted to preclude entry of foreign matter such as snowfall, for example, into the engine room 11, and is formed in a shape of a flat plate which protrudes upward in a direction substantially orthogonal to the front end part of the flat plate portion 41; and the front end part and the lower end part of the flat plate portion 41 are continuous to each other via a small thickness bending portion 55 (FIG. 1 (b)) which is reduced in thickness on the back side (the inside of the vehicle). The bending portion 55 is set to have a thickness on the order of 1.0 mm, for example, so as not to lower the rigidity of the cowl-top cover 16 (the cover main body portion 30) more remarkably than necessary; and is obtained as a inflection point portion of a flat plate inclined to the front lower side, which is bent in a V-shape and protrudes to a lower side so as to be folded toward the upper side with respect to the flat plate portion 41, and which is continuous from the front glass face 14a to the flat plate portion 41. Also, the rear part longitudinal wall portion 51 is formed so as to be continuous in the vehicle widthwise direction, integrally has: a plurality of non-curved portion 51a which are formed in a non-curved shape along the substantially vehicle widthwise direction; and a plurality of curved portions 51b which are curved in the forward and backward direction crossing with respect to the vehicle widthwise direction, and is divided into a side of the main body member 35 and a side of the auxiliary member 36 at positions of both end edge parts of the opening portion 38. Thus, the bending portions 55 that are positioned at the lower end part of the rear part longitudinal wall portion 51 are obtained as stress concentration portions 57 are respectively steeply bent in a direction crossing a longitudinal direction at a continuous part between a respective one of the non-curved portions 51a and a respective one of the curved portions 51b and at positions at both end edge parts of the opening portion 38, each of the stress concentration portions being greater in rigidity than any other site while a stress concentrates thereon more significantly than any other site with respect to a load (FIG. 5). In addition, at these stress concentration portions 57, low rigidity portions 58 which are lower in rigidity (which are smaller in thickness) than any other site of the bending portion 55 are respectively provided.

A respective one of the low rigidity portions 58 is obtained as a small thickness portion (a notch) which is smaller in thickness (FIG. 1 (a)) than any other site of the bending portion 55, for example. These low rigidity portions 58 each are set to have a thickness on the order of 0.5 mm, for example. That is, the low rigidity portion 58 is set to have a thickness which is on the order of half of any other site of the bending portion 55. Also, the low rigidity portion 58 is provided in an elongated square shape along the longitudinal direction on a back face (a lower face) of the stress concentration portion 57 of the bending portion 55; is continuous in a belt shape along the longitudinal direction; and is formed in a shape of intermittent (intermittently disposed) perforations in the longitudinal direction as a whole. Therefore, the low rigidity portion 58 is not positioned on a surface side (outside of the vehicle) of the cowl-top cover (the cover main body portion 30). It is to be noted that the low rigidity portion 58 can be variably set in length, width, and depth, whereby its related rigidity is set at a desired value.

The top wall portion 52 protrudes to a front side in a direction which is substantially orthogonal to an upper end part of the rear part longitudinal wall portion 51, and is obtained as a hood shield face portion 62 of which a top face portion is a counterpart member opposite portion (a hood opposite portion). The hood seal face portion 62 can also be referred to as a seal mounting portion or a hood seal mounting portion or the like; is opposite to a lower face of a rear part of the hood 12; and is formed in a shape of a flat plate. In addition, at an upper part of the hood seal face portion 62, there is disposed a hood seal 64 serving as a sealing member which can be elastically deformed by way of adhesive bonding or engagement from an upper side. In addition, the hood seal 64 is formed in a cylindrical shape made of a rubber or a thermoplastic elastomer, for example, and comes into intimate liquid contact with the hood 12 in a closed state so as to shut out the hot air or the offensive smell from the engine room 11.

The front part longitudinal wall portion 53 is formed in a shape of a flat plate protruding to a lower side in a direction which is substantially orthogonal to a tip end part of the hood seal face portion 62 that is a front end part of the top wall portion 52, and a lower end part of the top wall portion is continuous to the vehicle body mounting portion 32.

The vehicle body mounting portion 32 can also be referred to as a fixing portion, and is formed in a shape of a substantially horizontal plate which extends toward a front side, the plate being placed and supported on the support plate portion 26; and fixing portions, although not shown, such as a plurality of mounting holes formed in predetermined positions, are fixed to the support plate portion 26 of the vehicle body panel 22 by employing the appropriate mounting brackets such as rivets to be inserted into a mounting receptacle portion, although not shown, of the support plate portion 26. Also, as required, between the vehicle body mounting portion 32 and the support plate portion 26, a sealing member is disposed so as to shut out the vibration, the hot air, and the offensive smell from the engine room 11.

The cover mounting portion 33 is obtained as a protrusion portion also referred to as a glass alignment portion, a wind shield abutment portion, or alternatively, a wind shield mounting portion or the like, and protrudes toward a lower side to a back face portion (a lower face portion) of the flat plate portion 41, and further, a tip end part 33a bulges out in the forward and backward direction with respect to a proximal end part 33b formed in a shape of a flat plate. In addition, the cover mounting portion 33 pushes the cowl-top cover 16 to a lower side which is a predetermined direction crossing the front glass face 14a while applying to the engagement receptacle portion 29 at the front edge part of the front glass 14, whereby the tip end part 33a is engaged between the engagement protrusions 29a, 29a so as to be inserted into and mounted from an upper side along the front edge part of the front glass 14.

When the cowl-top cover 16 is mounted to the vehicle body 10, the tip end part 33a of the cover mounting portion 33 at the rear end part of this cowl-top cover is inserted into and engagingly mounted from the upper side to the engagement receptacle portion 29 of the engagement member 28 at the front edge part of the front glass 14, and the vehicle mounting portion 32 at the lower part of the front end of this front glass is placed on the support plate portion 26 and then are fixed by employing the appropriate mounting brackets. In addition, in a state in which the hood 12 is closed, the hood seal 64 that is supported by the hood seal face portion 62 is deformed and then comes into intimate contact with the hood 12 to thereby shut out the hot air or the offensive smell from the engine room 11 so as not to allow for air intake into the vehicle chamber 12 from the air intake of the main body portion 31. It is to be noted that, although in FIG. 1, a state representative of a natural state in which the hood seal 64 is not deformed is indicated by the dashed line, the hood seal 64 is established in such a deformed state as to collapse in a vertical direction in a state in which the hood 12 is closed.

Also, when a load (an external force) L is applied owing to a collision of an obstacle from an upper side, for example, the front glass 14 is distorted to a lower side, and in particular, a rear side of the cover main body portion 30 of the cowl-top cover 16 that is inserted into and connected to the front edge part of the front glass 14 from an upper side via the cover mounting portion 33 is deformed to a lower side in compliance with the deformation of the front glass 14. At this time, in the cowl-top cover 16, a stress concentrates on a respective one of the stress concentration portions 57, and a distortion at the peripheral portion of the respective one of the stress concentration portions 57 including these stress concentration portions 57 locally increases. Thus, as the distortion of the cowl-top cover 16 increases, a crack (a break) takes place along a respective one of the bending portions 55 while a respective one of the low rigidity portions 58 that are intentionally set at these stress concentration portions 57 is defined as a start point (FIG. 3 (a) to FIG. 3 (c) and FIG. 4). If a crack takes place with the cowl-top cover 16 in this manner, a resistance force with respect to a displacement (a deformation) of the front glass 15 lowers, and a value of a damage severity can be reduced.

Thus, according to the embodiment, the cover mounting portion 33 is inserted into the engagement receptacle portion 29 that is disposed at the front edge part of the front glass 14, from an upper side to a lower side in a direction crossing the front glass face 14a, whereby, for example, the front edge part of the front glass 14 and the cover main body portion 30 (the flat plate portion 41) can be caused to be continuous in flush with each other, its related appearance is improved, and in a case where the load L is applied from an upper side in a direction crossing the front glass face 14a, a stress concentrates on the low rigidity portion 58, the cover main body portion 30 is deformed while the low rigidity portion 58 is defined as a start point, and a resistance force L with respect to the load L can be restrained.

Also, a low rigidity portion 58 is formed at a part (the stress concentration portion 57) of the bending portion 55 that is continuous to the flat plate portion 41 disposed substantially in parallel to the front glass face 14a, the bending portion being folded and bent in an upper direction crossing the front glass face 14a, whereby, when the load L is applied from an upper side in the direction crossing the front glass face 14a, a stress is more likely to concentrate on the low rigidity portion 58, the cover main body portion 30 is deformed more reliably while the low rigidity portion 58 is defined as a start point, and a resistance force with respect to the load L can be restrained more reliably.

Moreover, the bending portion 55 moves to a lower side in compliance with a time point when the front glass 14 is deformed to a lower side by the load (stroke) L; and therefore, the deformation stroke can be easily increased in a vertical direction, and the cover main body portion 30 can be deformed more reliably.

Further, the low rigidity portion 58 is obtained as a small thickness portion formed in a shape of perforations which are intermittently formed in a longitudinal direction while a back face of the cover main body portion 30 is reduced in thickness; and therefore, when the load L is applied from an upper side in the direction crossing the front glass face 14a, the cover main body portion 30 is deformed more reliably while the low rigidity portion 58 is defined as a start point, a resistance force with respect to the load L can be restrained more reliably, and the low rigidity portion 58 cannot be seen from the outside of the vehicle (from an upper side) in a state in which the cowl-top cover 16 is mounted, and further, its related appearance is improved more remarkably.

In addition, a back face of a portion other than the low rigidity portion 58 of the bending portion 55 is reduced in thickness; and therefore, when the load (stroke) L is applied from an upper side in the direction crossing the front glass face 14a, the cover main body portion 30 is deformed more reliably from the low rigidity portion 58 and the bending portion 55, and a resistance force with respect to the load (stroke) L can be restrained more reliably.

Figure 7:
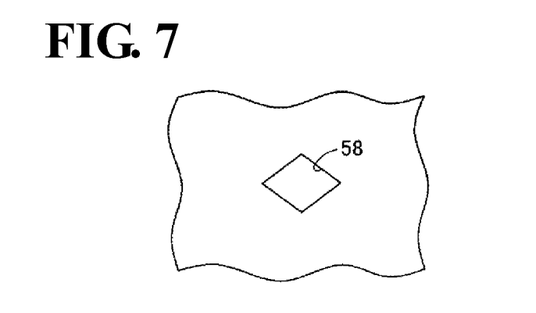
FIG. 7 is a plan view schematically showing a low rigidity portion of a cowl-top cover according to a second embodiment of the present invention.
Figure 8:
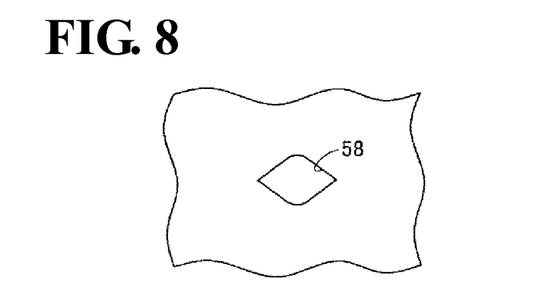
FIG. 8 is a plan view schematically showing a low rigidity portion of a cowl-top cover according to a third embodiment of the present invention.
Figure 9:
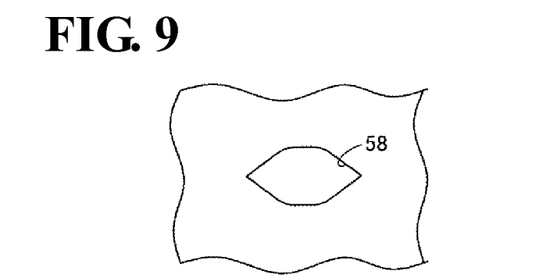
FIG. 9 is a plan view schematically showing a low rigidity portion of a cowl-top cover according to a fourth embodiment of the present invention.
Figure 10:
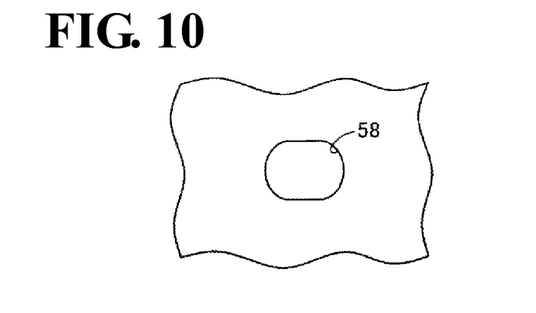
FIG. 10 is a plan view schematically showing a low rigidity portion of a cowl-top cover according to a fifth embodiment of the present invention.

It is to be noted that, in the first embodiment as described above, the shape of the low rigidity portion 58 is not limited to a rectangular shape, any shape may be formed as long as it is possible to form an elongated shape along the longitudinal direction of the cowl-top cover 16 (the cover main body portion 30) that is taken along the vehicle widthwise direction. For example, as is the case with the second embodiment shown in FIG. 7, the low rigidity portion 58 may be formed in a rhombic shape while a long diagonal line direction is taken along the vehicle widthwise direction, or alternatively, as is the case with the third embodiment shown in FIG. 8, a corner portion positioned at a short diagonal line of the low rigidity portion 58 according to the embodiment shown in FIG. 7 may be formed in a shape curved in an arc shape, or alternatively, as is the case with the fourth embodiment shown in FIG. 9, the low rigidity portion 58 according to the embodiment shown in FIG. 8 may be formed in a shape extended in a longitudinal direction. Also, as is the case with the fifth embodiment shown in FIG. 10, a long axis direction may be formed in an oblong circular shape (in an elliptical shape) or the like along the vehicle widthwise direction.

In addition, in a respective one of the embodiments described above, the low rigidity portion 58 may be obtained as a hole or the like adapted to penetrate the cowl-top cover 16, for example, in a case where this portion is provided on a site adapted to allow for entry of foreign matter such as water.

Further, the low rigidity portion 58 may be formed along the front edge part of the front glass 14 at a position spaced from the front end part of the front glass 14 to the front side by predetermined dimensions, as well as the stress concentration portion 57 of the cover main body portion 30.

Furthermore, the cowl-top cover 16 can be provided at a portion other than the front part of the vehicle body 10, and can also be disposed between a rear glass serving as a wind shield and a rear trunk hood or the like, for example.

INDUSTRIAL APPLICABILITY

The present invention can be applied to a cowl-top cover disposed between a front glass and a bonnet/hood of a motor vehicle, for example.

What is claimed is:

1. A cowl-top cover, comprising:
a cover main body portion disposed at an edge part of a wind shield with a vehicle widthwise direction being defined as a longitudinal direction,
wherein the cover main body portion comprises:
an engagement portion disposed along the longitudinal direction from one end part of the longitudinal direction, the engagement portion being inserted into and engaged with an engagement receptacle portion disposed at an edge part of the wind shield, in a direction crossing a wind shield face; and
a bending portion bent to protrude to a lower side along the longitudinal direction at a position spaced from the engagement portion to an opposite side to the wind shield, the bending portion including a low rigidity portion structure configured, at a back face and at the side of the wind shield, to be lower in rigidity than any other portion of the bending portion.

2. The cowl-top cover according to claim 1, wherein the cover main body portion further comprises:
a flat plate portion disposed substantially in parallel to the wind shield face; and
wherein the bending portion is configured to be continuous to the flat plate portion, and folded and bent in the direction crossing the wind shield face.

3. The cowl-top cover according to claim 2, wherein the bending portion is a portion which a back face of at least a part of a portion other than the low rigidity portion is reduced in thickness.

4. The cowl-top cover according to claim 1, wherein the low rigidity portion comprises a thickness portion formed in the longitudinal direction intermittently while the back face of the cover main body portion is reduced in thickness.

5. The cowl-top cover according to claim 1, wherein the low rigidity portion is configured to have a thickness that is on the order of half of a thickness of the bending portion.

6. The cowl-top cover according to claim 2, wherein the low rigidity portion is configured with the back face of the bent portion being reduced in thickness at the side of the flat plate portion.

* * * * *